US012639425B2

(12) United States Patent
Austin et al.

(10) Patent No.: US 12,639,425 B2
(45) Date of Patent: May 26, 2026

(54) THWARTING CONTROL PLANE ATTACKS WITH DISPLACED AND DILATED ADDRESS SPACES

(71) Applicant: REGENTS OF THE UNIVERSITY OF MICHIGAN, Ann Arbor, MI (US)

(72) Inventors: Todd Austin, Ann Arbor, MI (US);
Valeria Bertacco, Ann Arbor, MI (US);
Mark Gallagher, Ann Arbor, MI (US);
Baris Kasikci, Ann Arbor, MI (US);
Lauren Biernacki, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 449 days.

(21) Appl. No.: 17/635,692

(22) PCT Filed: Aug. 17, 2020

(86) PCT No.: PCT/US2020/046643
§ 371 (c)(1),
(2) Date: Feb. 15, 2022

(87) PCT Pub. No.: WO2021/034753
PCT Pub. Date: Feb. 25, 2021

(65) Prior Publication Data
US 2022/0277072 A1 Sep. 1, 2022

Related U.S. Application Data

(60) Provisional application No. 62/888,330, filed on Aug. 16, 2019.

(51) Int. Cl.
*G06F 21/54* (2013.01)
*G06F 21/55* (2013.01)
(Continued)

(52) U.S. Cl.
CPC ............ *G06F 21/54* (2013.01); *G06F 21/554* (2013.01); *G06F 21/577* (2013.01); *G06F 21/602* (2013.01); *G06F 21/71* (2013.01)

(58) Field of Classification Search
CPC ...... G06F 21/54; G06F 21/554; G06F 21/577; G06F 21/602; G06F 21/71; G06F 2221/2123
See application file for complete search history.

(56) References Cited

U.S. PATENT DOCUMENTS 10,223,527 B2 * 3/2019 Farchi ..................... G06F 21/54
2007/0250666 A1 10/2007 Sartorius et al.
(Continued)

OTHER PUBLICATIONS

Morpheus: A Vulnerability-Tolerant Secure Architecture Based on Ensembles of Moving Target Defenses with Churn, 2019, Association for Computing Machinery, p. 469-484 (Year: 2019).*
(Continued)

*Primary Examiner* — Alexander Lagor
*Assistant Examiner* — Taylor P Vu
(74) *Attorney, Agent, or Firm* — MARSHALL, GERSTEIN & BORUN LLP

(57) ABSTRACT

A method of securing a virtual address space against unauthorized access from an unauthorized agent includes generating a superimposed address space corresponding to the virtual address space, dilating the superimposed address space by inserting dummy memory at a plurality of locations in the superimposed address space, and displacing the superimposed address space by shifting a segment of the superimposed address space by a d-bit key. A computer processor includes a memory and a dedicated functional unit in a stage of a pipeline of the computer processor, the computer processor including an instruction that when executed by the dedicated functional unit causes the computer processor to
(Continued)

$$S_{ddas} = S_{vas} + i$$

translate one or more pointers between displaced and dilated address spaces of the memory and virtual address spaces of the memory.

19 Claims, 8 Drawing Sheets

(51) Int. Cl.
 G06F 21/57 (2013.01)
 G06F 21/60 (2013.01)
 G06F 21/71 (2013.01)

(56) References Cited

U.S. PATENT DOCUMENTS

| | | | | |
|---|---|---|---|---|
| 2009/0136026 A1* | 5/2009 | Celik | ..................... | H04L 9/065 |
| | | | | 380/42 |
| 2009/0217015 A1* | 8/2009 | Alexander | ........... | G06F 9/3867 |
| | | | | 712/E9.016 |
| 2010/0246443 A1 | 9/2010 | Cohn et al. | | |
| 2011/0069834 A1* | 3/2011 | Urbanik | ................ | H04L 63/045 |
| | | | | 380/28 |
| 2011/0099387 A1* | 4/2011 | Gremaud | ........... | G06F 12/1408 |
| | | | | 713/190 |
| 2011/0296206 A1* | 12/2011 | Henry | ..................... | G06F 21/72 |
| | | | | 713/190 |
| 2012/0011351 A1* | 1/2012 | Mundra | ................ | H04L 9/3242 |
| | | | | 713/192 |
| 2012/0072731 A1* | 3/2012 | Winograd | ............. | H04L 63/102 |
| | | | | 713/176 |
| 2012/0255003 A1* | 10/2012 | Sallam | .................. | G06F 21/554 |
| | | | | 726/23 |
| 2012/0260106 A1* | 10/2012 | Zaks | ...................... | G06F 21/14 |
| | | | | 713/190 |
| 2013/0086550 A1* | 4/2013 | Epstein | ................... | G06F 9/455 |
| | | | | 717/110 |
| 2015/0052616 A1* | 2/2015 | Hutchison | ............ | G06F 3/0632 |
| | | | | 726/27 |
| 2015/0186271 A1* | 7/2015 | Kass | ................... | G06F 12/1045 |
| | | | | 711/203 |
| 2015/0302195 A1* | 10/2015 | Acar | ...................... | G06F 21/52 |
| | | | | 726/23 |
| 2015/0318986 A1 | 11/2015 | Novak et al. | | |
| 2016/0026791 A1* | 1/2016 | Melski | ................... | G06F 21/54 |
| | | | | 726/25 |
| 2016/0092702 A1* | 3/2016 | Durham | ................... | G06F 9/35 |
| | | | | 713/190 |
| 2017/0293553 A1* | 10/2017 | Heller | ................... | G11C 29/52 |
| 2017/0364452 A1* | 12/2017 | Okhravi | ............ | G06F 11/1048 |
| 2018/0082056 A1* | 3/2018 | Farchi | ................... | G06F 21/554 |
| 2018/0322067 A1* | 11/2018 | Hajj | ...................... | G06F 12/109 |
| 2019/0018794 A1* | 1/2019 | Beard | ................ | G06F 9/30123 |
| 2019/0042799 A1* | 2/2019 | Durham | .................. | G06F 21/64 |
| 2019/0073481 A1* | 3/2019 | Angelino | ................. | G06F 8/65 |
| 2019/0087566 A1* | 3/2019 | Hosie | ...................... | G06F 21/54 |
| 2019/0095354 A1* | 3/2019 | Savry | ..................... | G06F 21/54 |
| 2019/0310944 A1* | 10/2019 | Rudoff | ............... | G06F 12/0811 |
| 2019/0310949 A1* | 10/2019 | Lev | ...................... | G06F 16/9024 |
| 2020/0125770 A1* | 4/2020 | LeMay | .............. | G06F 12/1458 |
| 2020/0167290 A1* | 5/2020 | Oh | .......................... | G06F 7/588 |
| 2020/0341666 A1* | 10/2020 | Bassov | .............. | G06F 11/1004 |
| 2021/0200686 A1* | 7/2021 | Gabor | .................. | G06F 9/3004 |
| 2021/0240526 A1* | 8/2021 | Weber | .................. | G06F 9/5016 |

OTHER PUBLICATIONS

International Search Report and Written Opinion, corresponding International Application No. PCT/US19/58166, mailing date Mar. 23, 2021.

* cited by examiner

800

GENERATE SUPERIMPOSED ADDRESS SPACE CORRESPONDING TO VIRTUAL ADDRESS SPACE — 802

DILATE SUPERIMPOSED ADDRESS SPACE BY INSERTING DUMMY MEMORY AT A PLURALITY OF LOCATIONS IN SUPERIMPOSED ADDRESS SPACE — 804

DISPLACE SUPERIMPOSED ADDRESS SPACE BY SHIFTING SEGMENT OF SUPERIMPOSED ADDRESS SPACE BY D-BIT KEY — 806

THWARTING CONTROL PLANE ATTACKS WITH DISPLACED AND DILATED ADDRESS SPACES

CROSS-REFERENCE TO RELATED APPLICATIONS

The present application claims priority to International Patent Application No. PCT/US20/46643 filed on Aug. 17, 2020, which claims the benefit of U.S. provisional patent application No. 62/888,330, filed Aug. 16, 2019. The priority application is hereby incorporated by reference.

STATEMENT REGARDING FEDERALLY SPONSORED RESEARCH OR DEVELOPMENT

This invention was made with government support under HR001118C0019 awarded by the U.S. Department of Defense, Defense Advanced Research Projects Agency. The government has certain rights in the invention.

FIELD OF THE DISCLOSURE

The present disclosure relates generally to techniques for securing computer systems against attacks and, more particularly, to techniques for securing an address space against unauthorized access from an unauthorized agent.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Computer security faces a challenging environment: regardless of the system, attackers seemingly always find vulnerabilities; and even if those vulnerabilities are fixed, attackers will search for ways around those protections. This "security arms race," as it is called, persists despite conventional advances in address protection.

For example, attackers may utilize relative address information to access and use pointers to execute arbitrary and/or malicious code on a host machine. A corrupted code pointer may effectively redirect program execution to attacker-injected code or existing code gadgets, whereas a data pointer may be used to hijack a loop condition. Both corrupted code pointers and corrupted data pointers may result in malicious control flow (e.g., a control flow attack).

Control flow attacks often rely on the use and manipulation of pointers that may be forged entirely, such as by injecting a string of bytecode, or are created through the manipulation of an existing pointer, such as by adding an offset to a return address. An attacker may create a pointer to attacker-injected code, and/or to existing code gadgets. Once a malicious pointer is made, the attacker either may use the malicious pointer to modify control flow of a program (e.g., by replacing an existing return address in the program, by replacing an existing function pointer in the program, and/or by overwriting a data variable (e.g., a variable used in a loop condition)). Regardless of the means of how the pointer is created, where it points to, or what it corrupts, attacks of this nature have two things in common. First, control flow attacks generally require some use of pointers, and second, control flow attacks result in the execution of attacker-chosen, malicious code on a target, or host, machine.

Existing techniques may attempt to protect pointers by enforcing specific program semantics, restricting access to pointers, and/or randomizing pointer values. For example, Control Flow Integrity (CFI) restricts jumps to the control flow graph, therefore prohibiting the use of code pointers not defined originally by the programmer. Code Pointer Integrity (CPI) stores all sensitive pointers in a protected memory region to prevent them from being overwritten by attackers operating in the user space. Address Space Layout Randomization (ASLR) and its variants randomize the location of code and data so attackers are unable to create a pointer to their desired target. Such enforcement techniques are costly, in that they must be facilitated by using up additional memory and/or computation cycles.

Memory corruption vulnerabilities in memory-unsafe programming languages (e.g., C and C++) have given attackers a direct means to influence the control flow of a target machine, resulting in the execution of arbitrary, malicious code crafted by the assailant. These control-flow hijacking attacks occur on the control plane, leveraging a memory vulnerability to overwrite an existing code pointer in the program. When a manipulated code pointer is used as the target of an indirect jump, such as for a function call or return, program execution redirects to the location chosen by the attacker.

The majority of attacks in the wild exploit vulnerabilities in memory-unsafe languages to hijack the control-flow of the target program. In many control flow attacks, memory is corrupted to replace an existing code pointer, such as a return address on the stack, with an attacker chosen value. Thus, once normal execution uses this hijacked value as the target of an indirect jump, control is redirected to the location of the attackers choosing.

Early exploits redirected program execution to malicious code injected by the attacker in the program's data segment. Code injection attack vectors are relatively simply mitigated (e.g., using data execution prevention (DEP), stack canaries, etc.). Yet attackers may overcome simple mitigation using specifically-crafted attacks designed to subvert existing protections. For example, stack canaries only thwarted a small portion of control flow attacks that used linear overwrites on the stack. Thus, canaries were easily bypassed when attacks corrupted memory elsewhere. DEP prevented attackers from executing injected code, yet this prevention merely prompted the attackers to shift the attack landscape. Rather than injecting code, attackers designed exploits to reuse code that was already present on the target machine. Specifically, without the inability to inject code, attackers were forced to use a much more evasive technique, i.e., exploit existing code on the target machine. In this way, mitigation only served to refine the attackers' techniques. Improved attacks reused existing code gadgets to trigger calls to system( ) or to form new code sequences as powerful as Turing-complete programs. In sum, despite being prevalent for decades, code execution vulnerabilities remain the most common vulnerabilities reported by the Common Vulnerabilities and Exposures (CVE) database.

Ultimately, code reuse has proven incredibly difficult to stop as it leverages the execution of existing code, which by definition, cannot be eliminated from a computing environment. Defenses have instead turned to detect shared characteristics of attacks, such as the frequent execution of code gadgets. However, even improved defenses are not comprehensive and thus are continuously being met by new and adapted attacks. The first code reuse attack was return-to-libc, which simply redirected control to a desired function in libc, such as system( ) by overwriting sensitive values on the stack. Return-oriented programming (ROP) followed, which stitched together multiple code gadgets— short instruction sequences ending in a return—to execute arbitrary programs on a target machine. Subsequent work expanded code gadgets to include other instruction sequences, such as those ending in a function call or indirect jump (i.e., jump-oriented programming or call-oriented programming). The seemingly never-ending security arms race has played out over the last thirty years, with new defenses driving the evolution of attacks. Control-flow attacks have quickly evolved in order to circumvent existing defenses, resulting in more complex attacks and increasing demands for low cost and comprehensive defenses.

Enforcement-based protections for code reuse attacks have mainly taken the form of Control Flow Integrity (CFI). CFI ensures that every indirect jump adheres to the program defined control-flow graph (CFG), leveraging the fact that code reuse attacks typically leave the CFG. However, both coarse-grained and fine-grained CFI variants have been successfully bypassed by exploits that cleverly select gadgets assumed by the defense to be benign.

The research community has also worked to develop randomization-based protections for mitigating control flow attacks focused on obfuscating either: i) the representation of code, ii) the location of code, and/or iii) the representation of pointers. The first of these randomization-based techniques prevents gadget discovery, while the latter two inhibit attackers from expressing their desired target. ASLR was the first randomization-based attack, and obfuscated the location of code by shifting the base address of each program segment. ASLR's address obfuscation was quickly adopted to thwart control flow attacks in their infancy. However, ASLR included multiple inherent deficiencies.

First early versions of ASLR had low entropy and were subject to brute force derandomization attacks that could derive code locations. Even 64-bit address spaces limit the degree of entropy to typically at most 30 bits. Second, relative code addresses are unaffected by ASLR techniques, so the defense is susceptible to memory disclosure attacks and partial-address manipulation. Because ASLR may only apply a single displacement to code and does not affect relative address distance, the disclosure of a single code pointer may reveal the location of all code gadgets for a known code segment. Third, ASLR randomizes base addresses only at load-time, thus advanced probes and side-channel attacks can deduce uncertain address values, given enough time.

Because ASLR had limited entropy and was vulnerable to information leaks, attackers crafted multi-step attacks that either leveraged memory disclosures, brute-force guessing, or side channels to derandomize the defense. Furthermore, while ASLR shifts the address space, it does not change the relative distance of objects within the same segment. Nuanced attacks that exploited the relative distance between objects readily subverted this defense. To combat these attacks, the community has adopted fine-grained ASLR variants that randomize the location of code at a function, basic block, or instruction granularity. This includes protections that randomized relative distance by either adding padding between objects, permuting objects, or both. In particular, a fine-grained ASLR variant called Address Space Layout Permutation both reorders and relocates the location of functions in the code segment during load-time. Most prior defenses focused on relocating function entries, while a handful supported permutation of basic blocks within functions.

In addition to prior work attempting to address the limitations of ASLR making ASLR more fine-grained by introducing randomization at the function or basic block level or re-ordering code, other defenses applied runtime re-randomization as a technique for mitigating memory disclosures, effectively placing a limit on the time to synthesize an attack. However, as noted above, systems that seek to obfuscate relative distance between functions and re-randomize their configuration at runtime for defensive purposes suffer from significantly larger overheads than the present techniques (e.g., from ~15% to as much as 200% or more), as well as lower entropy (e.g., much less than 30 bits).

The prevalence of ASLR in modern systems motivated ROP variants aimed specifically at derandomizing the program's secret memory layout. The first of these was JIT-ROP, which follows the target program's control flow and leverages a memory disclosure vulnerability to derandomize the location of code pages at runtime. Once significant portions of the code segment are known, the attacker discovers code gadgets and performs a just-in-time compilation of the ROP payload all without crashing the target program (which is assumed to restart with a new randomized configuration). Blind-ROP leveraged the observation that manipulating and crashing child processes could reveal information about the memory layout of the parent process without halting the target program. To subvert ASLR, Blind-ROP effectively reads code pointers on the stack by successively overflowing a single byte of the pointer and observing if the child process crashes. A similar approach is used to subvert stack canaries. Crash-Resistant Oriented Programming (CROP) demonstrated a technique to disclose code pointers without crashing, and leveraged to sequentially execute code gadgets.

Previous work has demonstrated that re-randomization of defenses at runtime is an effective approach to combatting memory disclosures. In these disruptive systems, if the program is re-randomized between a pointer disclosure and an exploit (i.e., when a jump instruction is invoked with the disclosed pointer), the attack will fail since that pointer has since become stale. TASR attempts to mitigate the memory disclosures plaguing ASLR by re-randomizing the memory layout on every system call. Thus, if an attacker attempts to output a pointer, that pointer is re-randomized before the attacker can inject a malicious input. However, TASR does not prevent attacks that use relative addressing. RuntimeASLR took a similar approach for mitigating Blind ROP by re-randomizing the memory layout of forked processes at runtime, which prohibits attackers from deriving the memory layout of the parent process by examining the child process. Remix obfuscates relative distance in the runtime code layout by reordering basic blocks within their respective functions. However, the location of function entries and distance between functions are not randomized, leaving the system vulnerable to code reuse attacks that make use of function calls.

Instead of obfuscating intra-function layout, Shuffler obfuscates the relative distance between functions by reordering them at runtime. Thus, Shuffler induces more chaos for attackers that are attempting to divert execution to a different function, rather than within the same function. Morpheus, the subject of related U.S. patent application Ser. No. 16/546,850, improves upon Shuffler by integrating hardware support to reduce overheads and randomize code location, but does not obfuscate relative distances. Mixr reorders in code chunks defined by the user, typically 40 B, but sacrifices performance for portability, incurring a 2.25× slowdown during runtime.

In summary, a successful pointer defense requires both high entropy and runtime re-randomization, and current techniques do not satisfy both of these properties. When implementing conventional enforcement techniques, developers often must relax pointer constraints to reduce overhead. However, when the constraints are relaxed, the now-incomplete protection offered by the conventional techniques is easily bypassed with more advanced attacks. In conventional techniques, preventing attackers from accessing pointers is a losing battle. An attacker can gain access to a pointer in a plethora of ways and new methods are frequently developed, often as a direct response to mitigation steps. Conventional techniques are not comprehensive and while some techniques (e.g., randomization) may improve efficiency, such techniques are predictable, and thus exploitable. Given the constant evolution of pointer-based attacks and high overhead of existing techniques, the goal of securing systems against pointer attacks remains unreachable by conventional pointer defense techniques. Even when conventional pointer defense techniques are used, they introduce overhead that must be relaxed to achieve usable performance. There is a need for achieving successful pointer defense having both high entropy and runtime re-randomization while maintaining low overhead.

SUMMARY OF THE INVENTION

In contrast to the conventional approaches discussed above that are predictable and/or include unacceptable overhead, the present application describes security techniques (e.g., Displaced and Dilated Address Spaces (DDAS)). Some embodiments of the present techniques use an inflation mechanism to obfuscate pointers in code and data segments. Other embodiments utilize cryptographic functions to create complex layouts of code and data segments. Some embodiments of the present techniques may leverage runtime re-randomization and custom hardware to achieve a high entropy defense with negligible overhead, while making an attacker's efforts to manipulate the pointer to a desired target without detection impractically difficult.

Specifically, by leveraging runtime re-randomization and custom hardware, the present techniques achieve a high-entropy control-flow defense with performance overheads well below 5% and similarly low power and silicon area overheads. For example, in example implementations, with DDAS in force, attackers would come up against 63 bits of entropy when forging absolute addresses and 18 to 55 bits of entropy for relative addresses, depending on the distance of the desired code gadget. Moreover, in example implementations, the first incorrectly forged code address will result in a security exception with a probability greater than 99.999%. DDAS is designed to prevent code reuse attacks on the control plane by obfuscating both the absolute and relative locations of objects in the code segment. DDAS does not prevent memory corruption, but rather detects when one is used to overwrite a code pointer and influence control flow. This approach makes it difficult for attackers to discover and leverage code pointers for any control-plane-based exploit. Unlike some prior works, DDAS does more than obfuscate the code segment. DDAS is also able to catch the manipulation of code pointers by detecting access to undefined regions of memory that make up a majority of the address space. Notably, in a table-based, 2 k entry DDAS configuration, on average more than 99.996% of the address space is undefined memory. Of the remaining 0.004%, only a small fraction is actual mapped memory. This mathematical reality makes it incredibly hard for an attacker to craft targets to code gadgets.

A computer-implemented method of securing a virtual address space against unauthorized access from an unauthorized agent includes generating a superimposed address space corresponding to the virtual address space, dilating the superimposed address space by inserting dummy memory at a plurality of locations in the superimposed address space, and displacing the superimposed address space by shifting and/or cryptographically encoding a segment of the superimposed address space by a secret key d.

A computer processor includes a memory and a dedicated functional unit in a stage of a pipeline of the computer processor, the computer processor including an indirect jump (jalr) instruction that when executed by the dedicated functional unit causes the computer processor to translate one or more pointers between displaced and dilated address spaces of the memory and virtual address spaces of the memory.

A computer processor includes a memory and a dedicated functional unit in a stage of a pipeline of the computer processor, the computer processor including a memory access instruction that when executed by the dedicated functional unit causes the computer processor to translate one or more pointers between displaced and dilated address spaces of the memory and virtual address spaces of the memory.

BRIEF DESCRIPTION OF THE DRAWINGS

For a more complete understanding of the disclosure, reference should be made to the following detailed description and accompanying drawing figures, in which like reference numerals identify like elements in the figures, and in which.

DETAILED DESCRIPTION

Introduction

The present techniques comprehensively stop control flow attacks on the control plane by, inter alia, detecting and deterring the action critical to control-flow hijacking attacks, i.e., the redirection of program execution resulting from a corrupted indirect jump target. Generally, attackers manipulate jump targets in one of two ways: 1) by forging a code pointer to their desired target or 2) by modifying an existing pointer, usually by adding some relative offset. To deter the manipulation of indirect jump targets, the present techniques include creating uncertainty in the address of code objects, for the absolute addresses and/or and relative addresses of the respective code objects, and this uncertainty is sustained over time by re-randomizing the addresses of code objects during program execution, effectively hardening the present techniques technique against advanced probing and side-channel attacks that have the potential to infer unknown values. Randomizing, via complex or cryptographic functions, the addresses of objects, or address obfuscation, secures applications by making them difficult to understand, and therefore hard to exploit, while preserving program semantics.

One important facet of the present techniques is that of dilation, which is inspired by the observation that large portions of the address space are unused. For example, in some modern systems (e.g., x86-64, ARM AArch64, RISC-V RV64), virtual addresses are 48 bits wide, and reduced instruction set architectures like RISC-V require the program counter to be aligned to a 4B boundary. Thus, in these systems, there are only $2^{46}$ possible valid pointer values, implying that more than 99% of the address space is unaddressable. Because a relatively vast space is unused, the present techniques advantageously use this unused space to dilate the current address space by $2^{18}$ or 262,144 times with no loss of usable address space. Advantageously, some embodiments of the present techniques use a randomization-based approach to boost uncertainty in code addresses to a point where it is incredibly difficult to forge code pointers and/or manipulate code pointers using relative distance information, effectively thwarting all known forms of control-flow attacks in the control plane.

Displacement and Dilation

Figure 1:
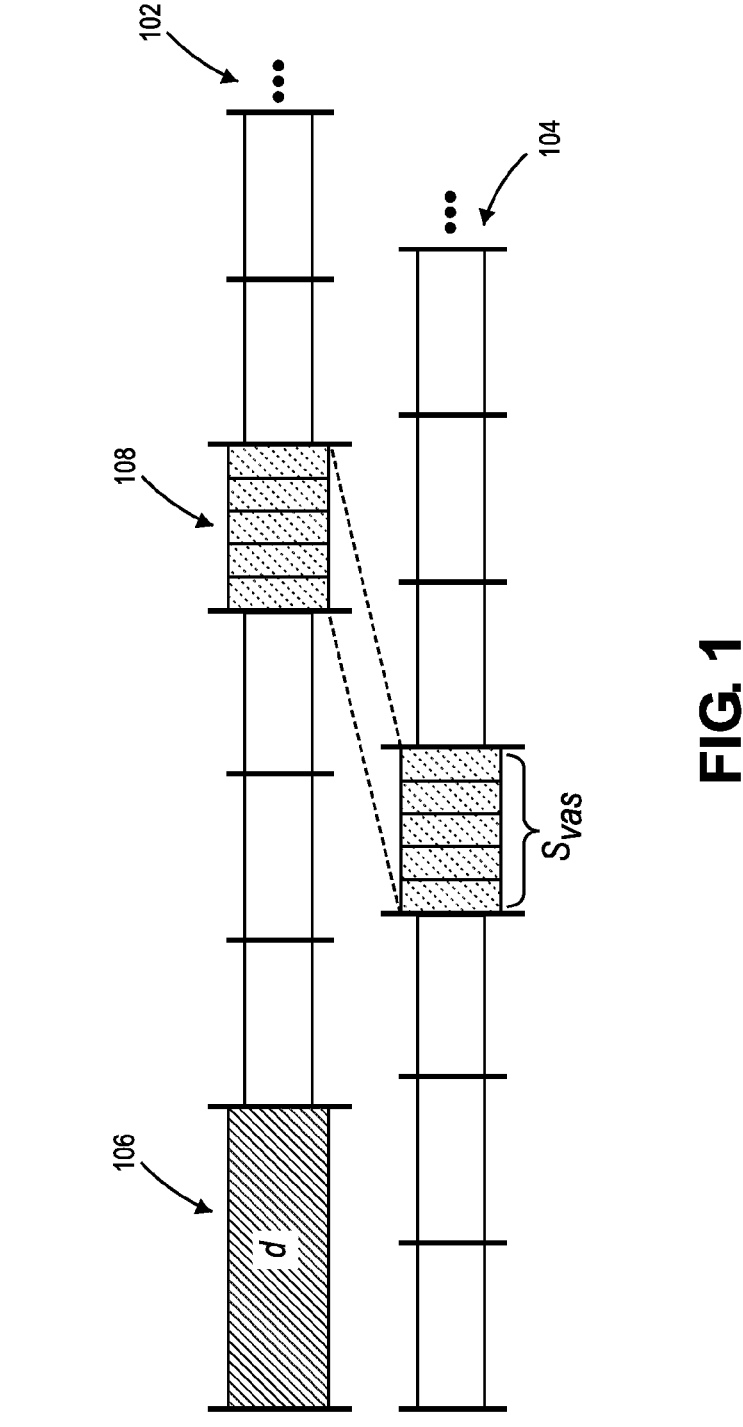
FIG. 1 illustrates an example memory address diagram depicting displacement of an address space by a constant offset d, according to an embodiment.

FIG. 1 illustrates an example memory address diagram 100 depicting address space displacement. FIG. 1 includes a superimposed address space 102 atop a virtual address space (VAS) 104, wherein the superimposed address space 202 corresponds to the VAS 104. To make code pointers difficult to forge, the present techniques introduce displacement. For example, FIG. 1 depicts an embodiment of displacement wherein a one-time shift 106 having a constant offset d is applied to the base of a code segment 108. In some embodiments, the shift 106 is low cost. Because the shift 106 occurs in the superimposed address space 102, the code segment 108 can be relocated anywhere, allowing the present techniques to use a large displacement key. It should be appreciated that the segment 108 may be a code or data segment.

Figure 2:
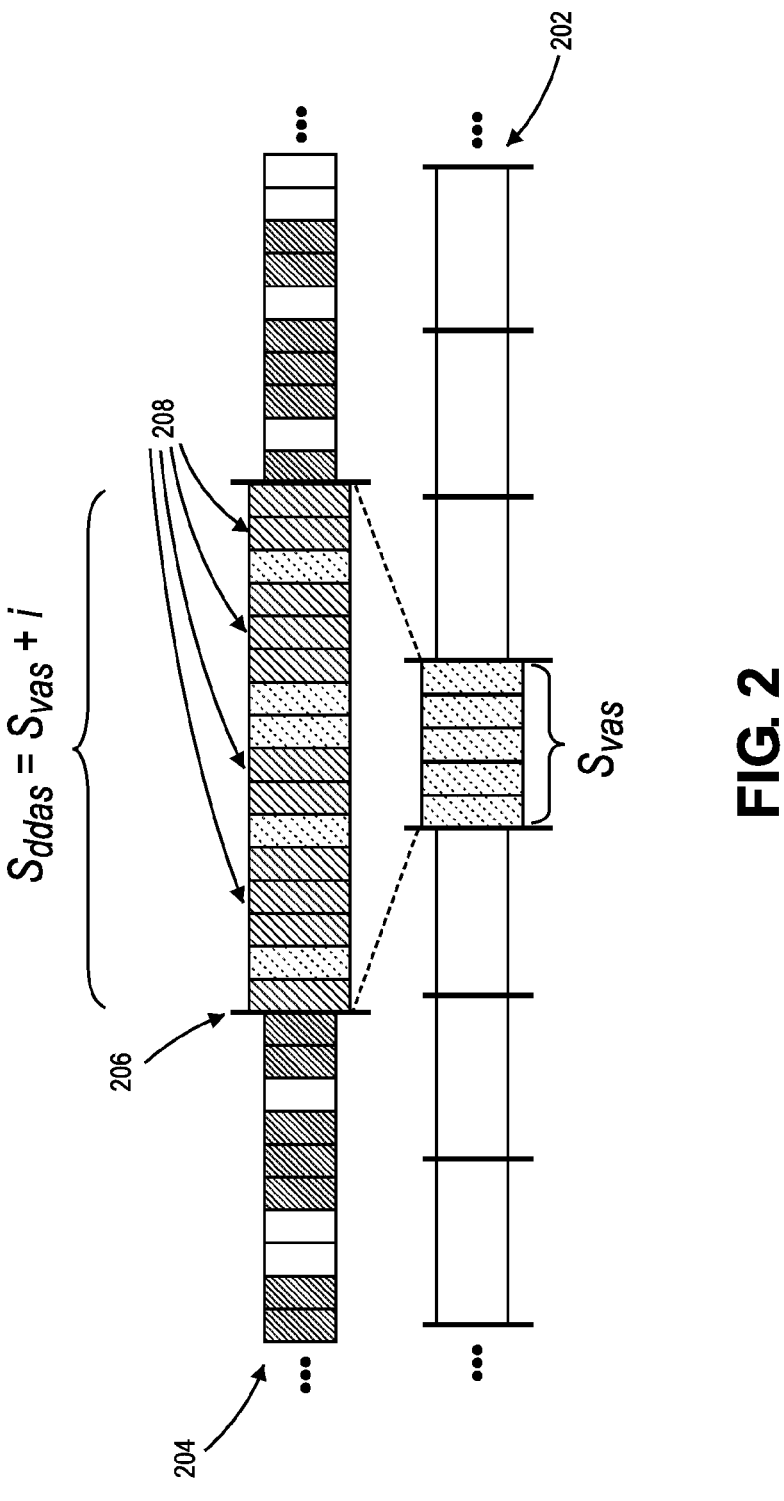
FIG. 2 illustrates an example memory address diagram depicting dilation of an address space by dividing the address space into segments of size $S_{vas}$, wherein each segment is inflated by i bytes via the insertion of untouchable holes, according to an embodiment.

FIG. 2 illustrates an example memory address diagram 200 depicting address space dilation. In general, dilation is a technique that creates super-inflated code space and quickly detects code pointer corruption. By leveraging the fact that most of the virtual address space is unused, the present techniques may distribute large regions of undefined memory throughout the address space. In an embodiment, to obfuscate the relative distance between objects, the present techniques introduce dilation. In an embodiment, dilation is achieved via the insertion of undefined memory locations, or holes, in a segment 206 that inflate a first address space 202 into a second address space 204 by a large amount (e.g., more than 250,000 times) at an instruction-level granularity. The first address space 202 may be a virtual address space, in some embodiments. The second address space 204 may be referred to as a superimposed address space, in some embodiments.

In an embodiment, the second address space 204 is inflated by the addition of untouchable holes 208 inserted into the segment 206. It should be appreciated that adjacent segments may include addresses having additional holes (not depicted). In some embodiments, the first address space 202 may correspond to the VAS 104 and the second address space 204 may correspond to the superimposed address space 102. Similarly, the segment 206 may correspond to the segment 108. In yet other embodiments, the first address space 202 is converted to corresponding addresses in second address space 204 by using a cryptographic function.

The holes 208 do not exist in the underlying VAS (e.g., the first address space 202), and therefore, any access to the holes 208 results in an immediate, permanent, and unrecoverable security exception. In fact, any read or write or execution of a null value (e.g., a value in one of the holes 208) leads to a security exception.

Preventing Control-Plane Attacks Using Displaced and Dilated Address Space (DDAS)

In an embodiment, the present techniques exploit unaddressable address space by both displacement and dilation, creating an inflated, superimposed address space, or DDAS, atop a VAS. To defend against code reuse attacks in the control plane, all code pointers in the program are expressed in the DDAS. Whereas the underlying VAS is addressable by a first number of pointers (e.g., $2^{46}$ distinct pointers), the superimposed DDAS is of a larger capacity and is addressable by a larger number of pointers (e.g., $2^{64}$ bytes addressable by $2^{64}$ distinct pointers) due to the use of large portions of conventionally unused address space.

The present techniques leverage the capaciousness of the superimposed DDAS to dilate the address space by over 250,000 times through the insertion of undefined memory locations in the DDAS. These regions, or holes, do not exist as accessible memory in the VAS, therefore any access to these holes results in an immediate security exception. Thus, any attempts to disclose or manipulate code pointers must first guess the value of a code pointer through high-entropy defenses, while never accidentally touching an undefined memory location. The present techniques make it incredibly unlikely that an attacker could successfully exfiltrate or manipulate a code pointer. Combined with runtime re-randomization, as discussed below, the challenges to an attacker presented by the layout of the DDAS are coupled with a very low count-down clock (e.g., 50 ms or less).

By inflating the address space to occupy all of the unused VAS, attackers, on average, have less than a 0.001% chance of crafting a valid pointer (i.e., a pointer to addressable memory). All the more, this chance reduces to an infinitesimally small number when trying to craft a pointer to a specific target within the program's code segment. All indirect jump targets and program code pointers are assumed to be expressed in this superimposed address space, allowing the present techniques to inject more diversity in pointer values and consequently significantly boosting the uncertainty faced by attackers that want to accurately forge or manipulate a code pointer. Additionally, by maintaining the program counter and indexing of microarchitectural structures with hardware-derandomized VAS code pointers, the present techniques are able to completely eliminate potential performance impacts in the memory system. Since even high entropy systems are attackable via secondary attacks (e.g., side-channels and memory disclosures), the present techniques re-randomize the defense at runtime to mitigate these secondary attacks that attempt to derandomize the memory layout. With hardware support, the performance overhead of the present techniques defense is negligible, at ~1% with re-randomization every 50 ms, while making control-flow hijacking attacks impracticable to execute.

In general, the present techniques may dilate two consecutive instructions by a 100 kB untouchable hole and obfuscate absolute locations using displacement to shift the address space by a d-bit key (e.g., a 64-bit key). Advantageously, neither displacement nor dilation has any impact on the underlying memory system.

Attack Vectors

The DDAS is designed to detect and deter code reuse attacks on the control plane, such as ROP and its advanced forms. DDAS may be used in conjunction with protection for code injection attacks, such as data execution prevention or W⊕X. As discussed below, DDAS may be adapted to data pointers, to thwart data-plane attacks like DOP.

The present techniques are designed to thwart a powerful attacker attempting to exploit gadgets to carry out a code reuse attack, where the execution of a single code gadget is indicative of a successful attack, even if the attacker has access to a memory disclosure vulnerability that can leak arbitrary information from the system, and even if the attacker has access to a memory corruption vulnerability that can be used to bootstrap their gadget chains. Further, the present techniques are designed to thwart an attacker who is able to analyze the program binary to search for code gadgets and derive code layout, and who is knowledgeable about DDAS and can identify the current re-randomization rate of the system. However, DDAS includes a private key for configuration that should be a secret at the start of the attack, and the system's random number source is assumed to produce true, non-repeating random numbers that cannot be predicted by the attacker.

DDAS is effective against classic attack vectors (e.g., ROP, JIT-ROP, Blind-ROP, and Spectre Variant 2). Dispatching ROP gadgets requires exploiting a memory corruption vulnerability to write a target code pointer to memory. In DDAS, the target code pointer is unknown to the attacker and is re-randomized every 50 ms on average. Additionally, if DDAS is maximally inflated, the attacker has less than a 0.001% chance of generating even a valid code pointer, i.e. a pointer to addressable memory.

JIT-ROP requires the use of a leaked code pointer to obtain code pages and construct gadgets at runtime. This attack faces several obstacles in DDAS. First, leaking a code pointer will result in an attacker having a DDAS address. Attempting to use this pointer to leak additional information involves code pointer arithmetic, which will very likely cause the program to access a hole and terminate. Second, if an attacker is somehow able to leak enough information about the DDAS configuration and stitch together gadgets for an attack, they must complete their attack before the next re-randomization cycle as any information gained will be lost.

Blind-ROP defeats ASLR by repeatedly overwriting a single byte of the return address in a child process until the process does not crash, signaling that the guessed byte was correct. This process is repeated with the subsequent byte, until the entire pointer has been uncovered. Ultimately, this technique can be used to derandomize ASLR and stack canaries, as well as uncover ROP gadgets. DDAS defeats this attack because, as detailed above, it is very unlikely to guess a valid code pointer. Additionally, this attack requires on average 1,500 requests to discover the canaries and ASLR configuration and empirically, was recorded to have taken about 1 minute on common applications (e.g., the webserver nginx). The present techniques randomize much more quickly (e.g., 1200 times faster) than the length of this attack at a period of 50 ms. This severely limits the time an attacker has to disclose stack pointers, discover gadgets, and use those assets to synthesize an attack. Additionally, simply re-randomizing on forked processes trivially defeats Blind-ROP.

Spectre Variant 2 trains the branch predictor to mis-speculate on an indirect branch by running an attacker process that attempts to mimic the target process's jumps. The goal is to get the target process to incorrectly jump to an attacker-specified destination. This requires the attacker to locate an indirect jump instruction they wish to divert control from in the target process. The attacker also needs target code, called a spectre gadget, to leak secret information. In DDAS, the attack is faced with shifted and dilated code objects, making it difficult to locate spectre gadgets. Also, all processes are under different keys, making it harder to understand and mimic the target's jump patterns.

The above examples are merely that. It should be appreciated that DDAS is effective in detecting and deterring many types of control plane attacks, in addition to those described above, that are now known or which will be developed in the future.

DDAS Translation

To maintain correctness for running programs, code pointers must be translated between the DDAS and VAS on the fly during runtime. Whenever a code pointer is created, it must reflect the DDAS value. Likewise, whenever a code pointer is used for an indirect jump, it must be translated from its DDAS representation into a VAS value. In some embodiments, these translations are tied intimately to the layout of the superimposed address space. To make these translations efficient, the present techniques choose a dilation scheme that lends itself to efficient compression by dividing the address space into segments.

Basic DDAS Translation

Figure 3:
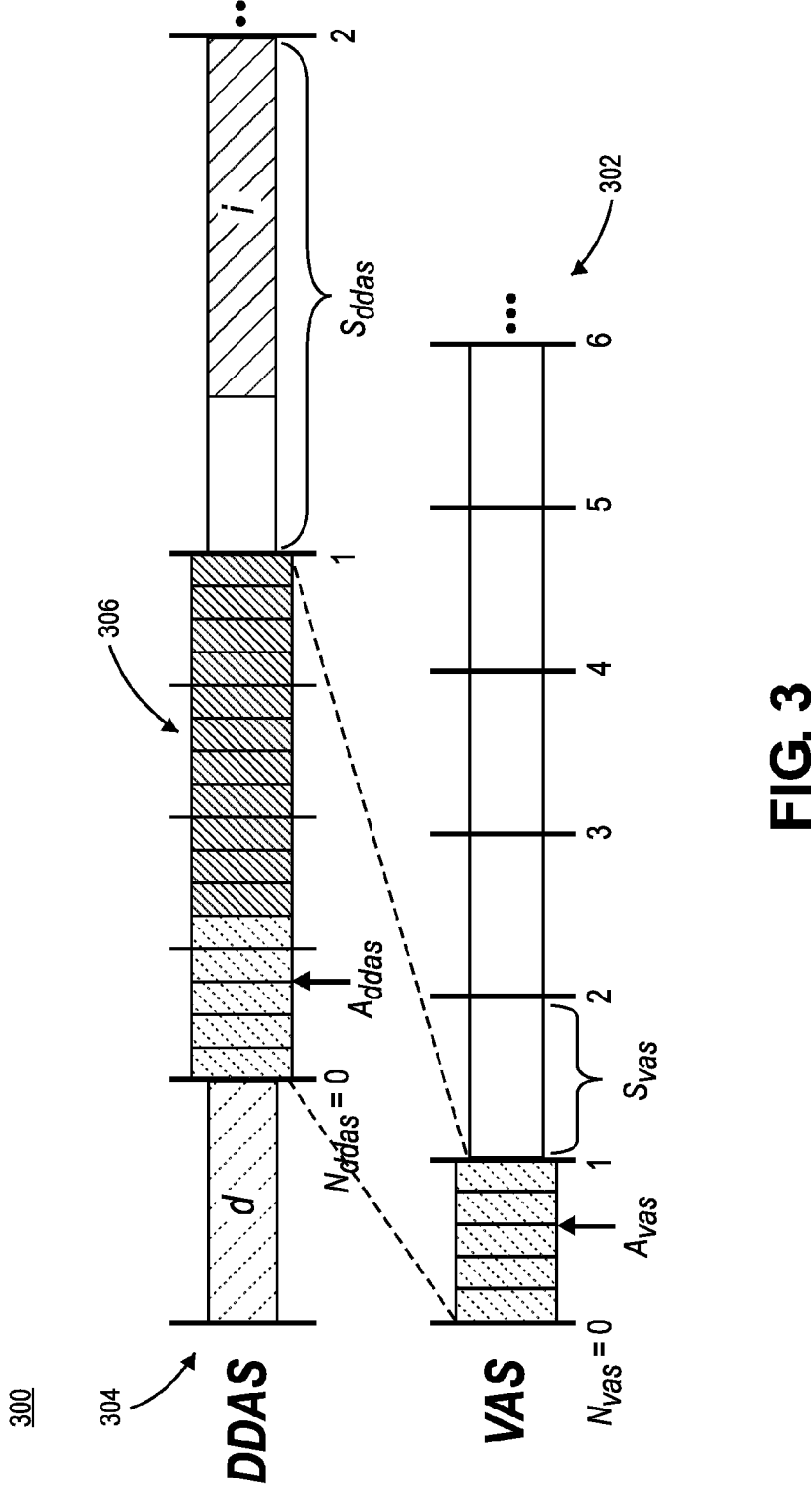
FIG. 3 illustrates an example memory address diagram depicting a virtual address space (VAS) over which is superimposed a basic displaced and dilated address space (DDAS), wherein the VAS is divided into segments of size $S_{vas}$, each segment is mapped into the DDAS and padded by an i-byte hole, the entire DDAS is shifted by d bytes, and the current segment number (i.e., $N_{vas}$ or $Na_{das}$) indicates the amount of dilation inserted prior to the corresponding address; according to one embodiment and scenario.

FIG. 3 depicts an example memory address diagram 300 depicting a VAS 302 over which is superimposed a basic DDAS 304. In FIG. 3, the entire address space is shifted by a constant d displacement. To implement dilation, the VAS 302 is divided into segments of size $S_{vas}$, wherein the segments may or may not be contiguous in memory. Each segment is mapped onto an inflated DDAS segment of size Sddas, which consists of the valid VAS addresses followed by an i byte hole. In the depicted example, the Avas segment is mapped to a segment in the DDAS 304 that includes an i-byte hole 306. Thus, the size of the inflated DDAS segment is equal to the size of the virtual address space segment plus the number of hole bytes ($S_{ddas}=S_{vas}+i$). In general, the layout of the DDAS may be parameterized by the keys d, i, and $S_{vas}$. To translate a VAS pointer, $A_{vas}$, to its DDAS value, $A_{ddas}$, first the pointer must be incremented by the displacement d. Then, any undefined memory locations that come before $A_{ddas}$ must also be added to the pointer value. The number of holes before $A_{ddas}$ is indicated by the segment $A_{vas}$ is located in.

In FIG. 3, $A_{vas}$ is in the 0th segment, hence no holes come before it. If $A_{vas}$ was instead in the 8th segment, eight holes come before it, meaning that 8*i must be added to the pointer value. The current segment number is given by the variable $N_{vas}$. Translating a DDAS pointer to its VAS value is similar. First, the present techniques undo the displacement and dilation mechanisms by subtracting the displacement d from the pointer, along with any undefined memory locations that come before it. Again, the number of holes to subtract is indicated by the DDAS segment number $N_{ddas}$. In the following, the translations are formally specified. The VAS→DDAS translation is given by $$A_{ddas}=A_{vas}+d+(N_{vas}*i)$$

Where $N_{vas}$ is the current VAS segment number, i.e. the segment $A_{vas}$ is located in, given by:

$$Nvas = \left\lfloor \frac{Avas}{Svas} \right\rfloor$$

Similarly, the DDAS→VAS translation is given by:

$$A_{vas}=A_{ddas}-d-(N_{ddas}*i)$$

Where $N_{ddas}$ represents the current DDAS segment number:

$$Nddas = \left\lfloor \frac{Addas - d}{Sddas} \right\rfloor$$

In some embodiments, translating from DDAS→VAS may include checking that $A_{ddas}$ maps to a valid location in the virtual address space. For example, the present techniques may include checking that the current pointer is not to a hole, to avoid corrupting a DDAS pointer by an attacker, and any access to a DDAS hole is indicative of an attack. To verify that $A_{ddas}$ is valid in the basic DDAS design, the present techniques may check if the offset into the current DDAS segment is less than the size of the VAS segment, since the DDAS segment is equivalent to the VAS segment followed by a hole, according to the following equation:

$$(A_{ddas}-d)\bmod S_{ddas}<S_{vas}$$

Modulo operations are costly computations. Therefore, in some embodiments, the present techniques may use the following equivalent computation, having a reduced overhead:

$$A_{ddas}-d<(N_{ddas}*S_{ddas})+S_{vas}$$

Using these computations, the present techniques may translate back and forth between the VAS and DDAS segments and verify that pointers do not access undefined memory locations in the superimposed address space.

Basic DDAS is effective at inflating the address space, but because the hole size i may be a constant, spatial diversity may be improved in some embodiments. In some embodiments, a table-based DDAS translation is implemented to increase the level of entropy of the defense.

Table-Based DDAS Translation

Figure 4:
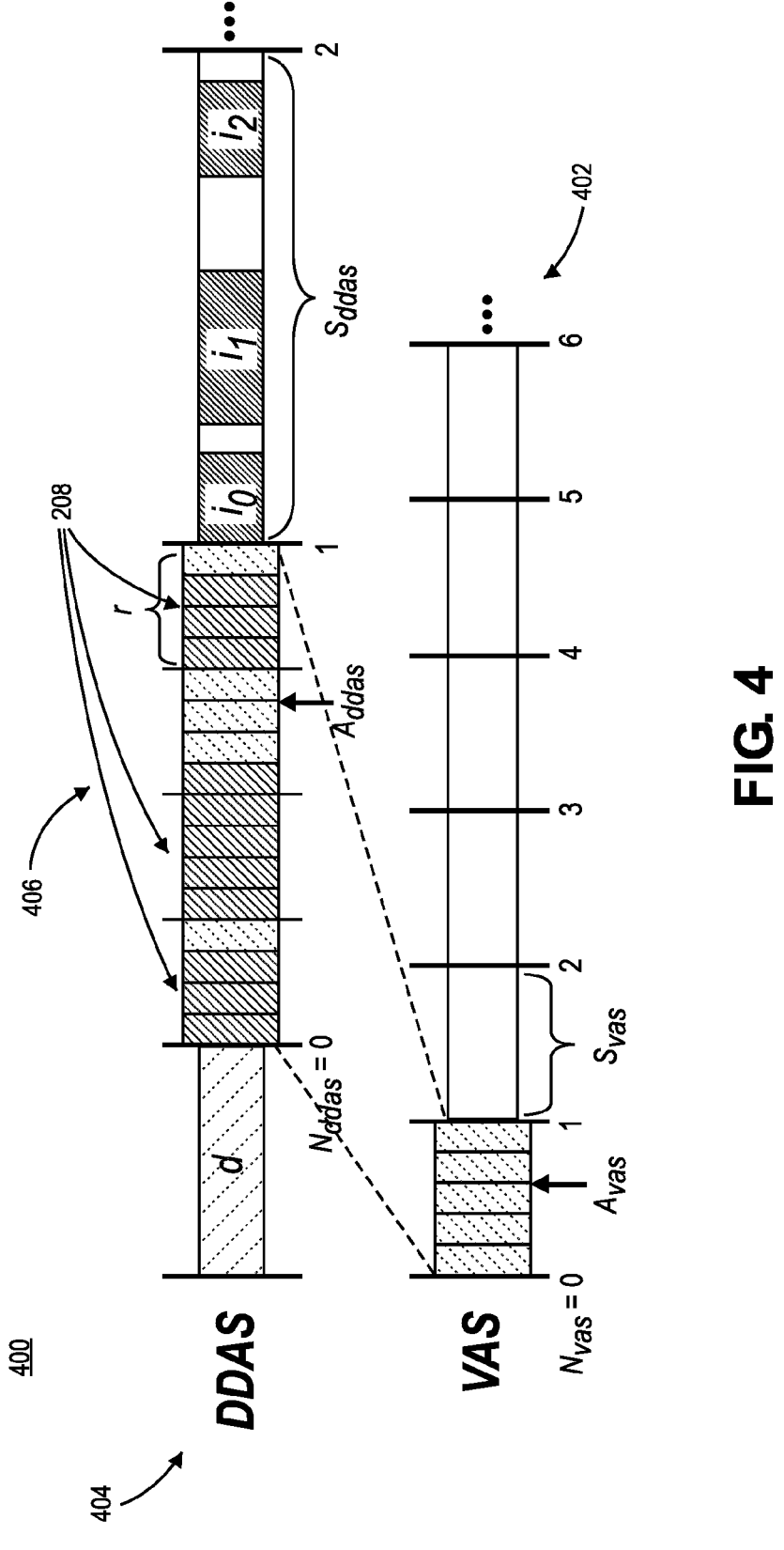
FIG. 4 illustrates an example memory address diagram depicting a VAS over which is superimposed a table-based DDAS, wherein the VAS is divided into segments of size $S_{vas}$, each segment is mapped into the DDAS and padded by varying-sized holes between valid VAS addresses within the segment, the individual holes in each segment, $i_0$-$i_n$ summing to i bytes, and each segment divided into smaller ranges of size r to efficiently track the locations of holes in a range-map table; according to an embodiment.

FIG. 4 depicts an example memory address diagram 400 depicting a VAS 402 over which is superimposed a table-based DDAS 404.

In FIG. 4, the i-byte inflation is distributed throughout a segment 406 as multiple, distinct holes 408. This distribution increases diversity by varying the size and location of holes across the code space. Conceptually, the segment 406 can be viewed as a stencil applied across the code segment. The configuration of the holes in the segment 406 (i.e., the "stencil") is recorded in a small table. Additionally, this table allows the present techniques to inflate the address space at an instruction-level granularity, meaning that the design can support dilation between every instruction in the code segment. In some embodiments, to maintain this consistency, the size of the VAS segment is limited to no larger than four times the number of entries in the table and the size of the associated DDAS segment can be over 250,000 times larger, with the resulting undefined memory locations distributed in any fashion through the segment. The performance-security tradeoffs of different table sizes are discussed below.

Translations between VAS and DDAS are similar to that for the basic DDAS design. However, in addition to considering the cumulative hole in previous segments, the present techniques may also consider if any holes come before the given address in the current segment. For example, in the segment 406, 8 hole bytes, depicted in cross hatch marks, precede the address Addas. To derive this information for VASD→DAS translations, a table is indexed by the VAS segment offset, denoted $O_{vas}$, to find the cumulative hole size. The result of the table lookup is then added to the address. This translation is given by:

$$A_{ddas}=A_{vas}+d+(N_{vas}*i)+T[O_{vas}]$$

Where the VAS segment offset is calculated via:

$$O_{vas}=A_{vas}\bmod S_{vas}$$

The table tracks the mapping between valid bytes of the VAS segment and DDAS segment. To make the table storage efficient for the DDAS→VAS translation, the present techniques divide each segment into smaller ranges of size r, and store both the size of the hole in that range and the cumulative holes before that range in the table. Thus, the table is accessed both for DDAS→VAS translation and for hole checking.

For example, in FIG. 4, the range size r is four. Thus, $A_{ddas}$ is located in the 0th segment and the 2nd range. Looking up this range number in the table T returns an aggregate hole size of 8 bytes and a current hole size of 1B, denoted by $T_a$ and $T_c$, respectively. The aggregate hole size is deducted from $A_{ddas}$ in an effort to translate the address, whereas the current hole size is used for a comparison to deduce if $A_{ddas}$ is a hole.

The DDAS→VAS translation is given by:

$$A_{vas}=A_{ddas}-d-(N_{ddas}*i)-T_a[R_{ddas}]$$

Where the DDAS range number is calculated via:

$$R_{ddas}=O_{ddas}/r$$

And the DDAS segment offset is calculated via:

$$O_{ddas}=A_{ddas} \bmod S_{ddas}$$

Again, whenever translating from DDAS→VAS, the present techniques may check that the translated address is not to an invalid memory address, i.e., a DDAS hole. To check if $A_{ddas}$ is the address of a hole, the present techniques can use information about the address's range, namely the current hole size of the range, given by $T_c$, and the offset into the range. The current address is a hole if:

$$O_{ddas} \bmod r < T_c[A_{ddas}]$$

Many additional embodiments of mapping functions from DDAS→VAS exist. In some embodiments, primary requirements include that the function be i) complex and ii) a one-to-one mapping, such that multiple DDAS addresses do not map to same VAS address. Cryptographic functions, such as AES, ChaCha, PRINCE, etc. would work appropriately as a translator from DDAS→VAS.

Efficient DDAS Algorithms

DDAS is parameterized by the VAS segment size $S_{vas}$, DDAS segment size $S_{ddas}$, displacement d, and the hole layout, represented by either i or the table T. These keys can be constrained to match the desired performance-security tradeoffs of the application. For example, in an embodiment, a performance goal may be to reduce the overall latency incurred by indirect jump, or jalr, instructions. In both basic and table-based DDAS, the present techniques may calculate the DDAS segment number $N_{ddas}$ to perform a DDAS→VAS translation. Hence, the above equation $$Nvas = \left\lfloor \frac{Avas}{Svas} \right\rfloor$$

is performed before every indirect jump. Because this equation contains division, it takes an order of magnitude longer than other arithmetic operations.

Thus, in an embodiment, the present techniques constrain $S_{ddas}$ to be a power of two, thus reducing the overhead by allowing the division operation to be replaced by a shift operand:

$$N_{ddas}=(A_{ddas}-d)>>\log_2(S_{ddas})$$

Where $\log_2(S_{ddas})$ is a constant that can be stored locally for efficient calculation.

In some embodiments, the hole check and DDAS segment offset equations provided above may be respectively optimized to:

$$A_{ddas}-d<(N_{ddas}<<\log_2(S_{ddas}))+S_{vas}$$

And $$O_{ddas}=A_{ddas}\&(0x\text{ffffffff}>>\log_2(S_{ddas}))$$

In summary, constraining Sddas removes lengthy operations on the critical path. The present techniques may also constrain the hole size, i, as a power of two to eliminate the multiplication in the VASD→DAS translation equation, the DDAS→VAS translation equation, and the table lookup equations.

DDAS RISC-V Architecture Extensions

In general, DDAS pointers are represented by a full 64-bit value and do not need to be aligned to a 4 B boundary like traditional code pointers, assuming that the hardware never discards the lower two bits of code pointers. Additionally, the program counter is generally kept as a VAS value to reduce the impact on instruction fetch and direct jumps. However, in some embodiments, the representation of code pointers is changed. Therefore, the present techniques consider the impact of this changed representation on program execution, and take various steps to maintain correctness.

First, the present techniques maintain correctness for Direct Jumps (JAL/BR). Direct jumps add a constant offset, encoded in an immediate, to the program counter. Because the present techniques maintain the program counter in VAS, direct jumps function as they do conventionally—the immediate is added to the program counter as normal. The fact that direct jumps are not modified has no known security implications as direct jumps cannot be modified by malicious inputs, because the instruction encodes their targets.

Second, the present techniques maintain correctness for Indirect Jumps (JALR). Indirect jumps, or jump and link register (jalr) instructions load a register value into the program counter and add an offset. This instruction is used for all function calls and returns, as well as other arbitrary control flow. In the present techniques, a code pointer in a register is included in the DDAS. Therefore, the present techniques perform a DDAS→VAS translation on the register value before writing the program counter with it. This translation occurs implicitly in the microarchitecture discussed below through a dedicated functional unit. Additionally, when the jalr instruction writes the link register, the microarchitecture translates the (pc+4) link address from a VAS address to a DDAS address.

Third, the present techniques maintain correctness with respect to Code Pointer Provenance (LUI/AUIPC). In general, the target of a function call in the RISC-V instruction set is formed at runtime using a lui (or auipc) and addi instruction sequence that creates a 64-bit pointer from immediate values. In some embodiments of DDAS, the RISC-V compiler/linker is modified to replace these VAS creation sequences with a code pointer load that is properly translated to the DDAS address space. For example, the present techniques may include a RISC-V compiler that is modified to relocate all code pointers to the global segment, so that the code pointers can be randomized into the DDAS at program load time. Advantageously, the present techniques can then configure DDAS pointers without rewriting the code segment (or including backdoor instructions to translate VAS addresses to DDAS at runtime), and enables the present techniques to readily rerandomize code pointers, as discussed in greater detail below. In some embodiments, the RISC-V program loader is modified to translate the static code pointers into the DDAS address space, with a load-time generated random key to configure the DDAS address space. In such cases, the present techniques properly represent all code pointers as DDAS addresses when the program begins execution.

Fourth, the present techniques maintain correctness with respect to Code Pointer Arithmetic (ADD/AD-DI/etc.). Arithmetic on code pointers is discouraged in DDAS, but it is still permitted and supported. In general, attempting to translate a code pointer that has been modified will with high probability result in the table lookup either returning a different range's information, or falling into a hole. This is not surprising, considering that selective access by pointer address manipulation is a primary case that DDAS is meant to prevent. In other words, attacks that attempt to exploit relative distance between addresses by performing arithmetic on code pointers are those that the present techniques are designed to detect and deter. Therefore, in some embodiments of DDAS, arithmetic on code pointers is considered to be abnormal program behavior. Other paradigms/standards (e.g., the C1x Standard) do not allow arithmetic operations on pointers to function types or incomplete types (e.g., void*). Although it is possible to allow code pointer arithmetic with the GNU extension to C, DDAS also discourages this type of operation. Advantageously, buggy programs that are executed using the DDAS techniques disclosed herein that inadvertently use a data pointer as a code pointer, and/or overwrite or manipulate a code pointer, will generate an exception with exceptionally high probability, leading to easier debugging and program verification.

DDAS Microarchitecture Embodiments

The present techniques implement DDAS in hardware with two goals in mind. First, to maintain confidentiality of the keyed parameters from software, and second, to mitigate any performance impacts of the DDAS→VAS translation on running programs.

Regarding confidentiality, in both basic and table-based DDAS, the parameters of the keyed configuration must remain secret. With hardware support, the present techniques can keep these parameters in special registers inaccessible to user code. Additionally, by implementing the Range-Map table for table-based DDAS in hardware, as is done in some embodiments, the present techniques can assure that the Range-Map table is inaccessible to users. It should be appreciated that alternative ways of storing/loading the secret parameters of the keyed configuration are envisioned, such as a hardware authentication device.

Regarding performance, it should be appreciated that DDAS can be entirely implemented in software. However, such embodiments may include a performance cost due to the complexity of table-based DDAS. The performance cost is caused by each jalr/ret requiring bit shifts, subtracts, a multiply, and a table lookup. Implementing parts of DDAS in hardware alleviates such performance costs, and DDAS integrates readily and well into the processor pipeline. Empirical results suggest that indirect jumps do not make up a large percent of instructions (e.g., less than 2%). However, instrumenting indirect jumps with multiple additional instructions to perform the DDAS translation may be costly. In embodiments, the hardware support to implement DDAS with load-time randomization is minimal, as DDAS may impact indirect jumps during program execution. In those embodiments, necessary modifications may include the DDAS→VAS translation and securely storing the DDAS configuration keys. Extensions to support runtime re-randomization are discussed below.

Therefore, to compute the DDAS→VAS translations described above, some embodiments of the present techniques add a dedicated functional unit (FU) to the pipeline to process instructions (e.g., jalr). In some embodiments, the functional unit is added to the execute (EX) stage of the pipeline, because the source register of a jump instruction is resolved by the beginning of this stage. Additionally, because jalr instructions are idle during the subsequent writeback (WB) stage, the present techniques are able to hide some of the translation latency by overlapping computation across these two stages.

Figure 5:
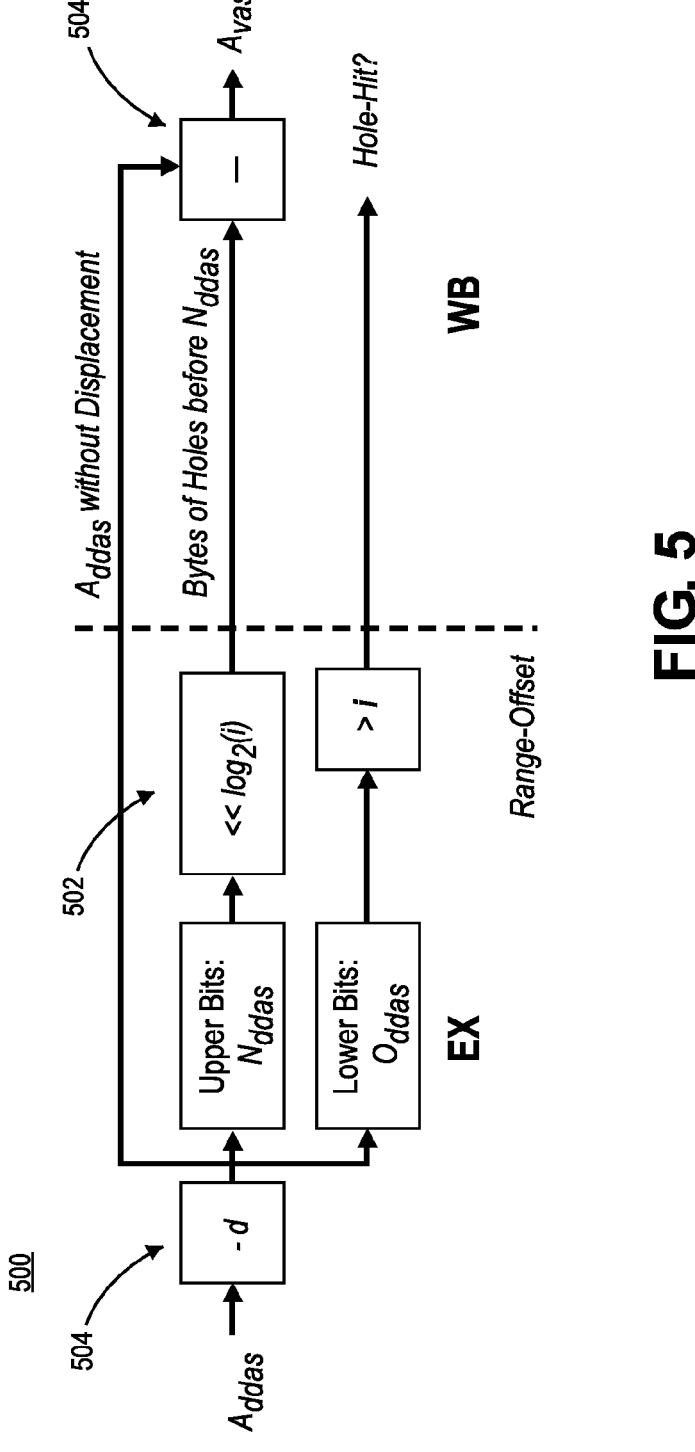
FIG. 5 depicts a dedicated functional unit for implementing basic DDAS, wherein the DDAS segment number $N_{ddas}$ is obtained using the upper bits of a DDAS address, the segment offset $O_{ddas}$ used to determine the segment offset and a single shift is used to calculate the bytes of holes before the address $A_{ddas}$, according to an embodiment.

FIG. 5 depicts a dedicated FU 500 for basic DDAS, which implements the above shift-optimized DDAS→VAS computation. The FU 500 includes a shift 502 and two subtractions 504. Thus, the operation represented by the FU can be performed in two CPU cycles total.

Figure 6:
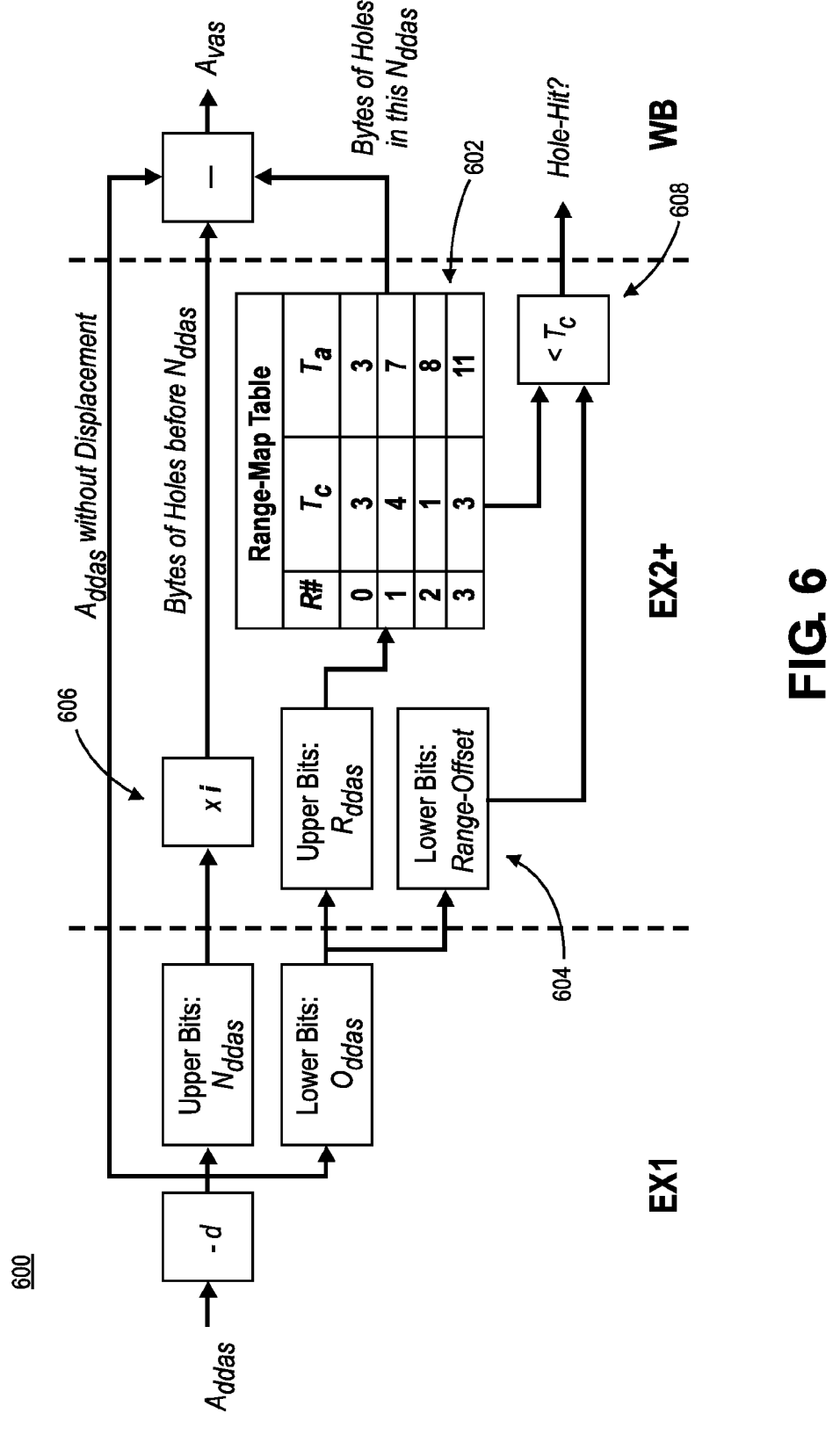
FIG. 6 depicts a dedicated functional unit for table-based DDAS, wherein the DDAS segment offset $O_{ddas}$ is shifted to derive the range number $R_{ddas}$ that indexes a range-map table, the range offset is compared against $T_c$ to determine if $A_{ddas}$ is an undefined memory location, the range-map table provides $T_a$ for calculating $A_{vas}$, and stage EX2+ may be lengthened depending on the range-map latency; according to an embodiment.

FIG. 6 depicts a dedicated FU 600 for Table-Based DDAS, which includes a Range-Map Table 602 that stores an aggregate hole size and current hole size of a particular range, denoted $T_a$ and $T_c$ as in the above equations. Because this translation requires a table-lookup 604 and a multiply operation 606, the FU 600 may have a longer latency than another FU, such as the FU 500. However, the present techniques may run the table-lookup 604 in parallel with the multiply operation 606, masking the latency of the multiply operation 606. Since the multiply operation 606 is no longer on the critical path, some embodiments may not replace the multiply operation 606 with a shift operation as in FIG. 5, thereby providing additional entropy for i.

The overall latency of the FU 600 is dependent on the size of the Range-Map table. It should be appreciated that different configurations may have different performance, and some are discussed herein. To perform the DDAS→VAS translation, the Range-Map table may be indexed by the range number ($R_{ddas}$) (depicted R# in FIG. 6) of a particular DDAS address, and returns two pieces of information: the aggregate total of all holes prior to this range ($T_a$) and the size of the hole within the current range ($T_c$). Generally, the present techniques use $T_a$ to translate the DDAS address, requiring hardware support in the form of a multiply, subtracts, and shifts. Generally, the present techniques use $T_c$ to perform a hole check 608. Specifically, the FU 600 includes a comparison checking whether the range offset is above the hole threshold for a given range, to check if a hole is being accessed. The hole check 608 is a straightforward comparison because holes are always at the start of a range.

Key Generation/Storage and Context Switching

In some DDAS embodiments, parameters of the defense are determined at load-time. In basic DDAS, determining parameters at load-time includes generating random numbers to determine the displacement (d), hole size (i), and size of a VAS segment ($S_{vas}$). These values are stored in special registers inside the hardware. Similarly, in some embodiments of table-based DDAS, the parameters d, i, Svas, and r, are randomly generated. Some table-based DDAS embodiments may require additional setup to populate the Range-Map table with $T_c$ and $T_a$. The present techniques may populate the Range-Map table deterministically, given a certain seed, to support efficient context switching. First, the present techniques may use a True Random Number Generator (TRNG) to generate a Range-Map key. Second, the Range-Map key may be used to seed a Pseudo-Random Number Generator (PRNG) to determine the Range-Map table's layout.

Some embodiments of DDAS support context switching, wherein individual processes have unique DDAS configurations (i.e., separate keys). Context switching is an important facet of modern computing systems, wherein multiple processes share one or more CPU. To enable context switching for basic DDAS, the present techniques may encrypt the keys for d, i, and $S_{vas}$ under a hardware key (e.g., a boot-time key) before writing the key out to memory. When a process switches back in, the present techniques loaded and decrypt the matching DDAS parameters to be used again. To enable context switching for table-based DDAS, the present techniques may store an additional key, the Range-Map key which, along with the range size (r), is encrypted with the other parts of a DDAS context. When the context is loaded back in, the Range-Map key is used to seed the PRNG, generating the same table layout that was used before the context switch. This regeneration eliminates the need for the hardware to dump a 2 k-entry table to memory, which can be slow due to encrypting a large block of data.

Runtime Re-Randomization

Optionally, runtime re-randomization can be integrated into the DDAS framework, creating a re-randomized DDAS, or DDAS-R. Re-randomization has been shown to add only one additional bit of entropy when guessing a pointer value. However, re-randomization is effective at deterring multistage attacks as well as attacks with significant probing requirements. Additionally, the research community has frequently cited re-randomization as a protection mechanism for memory disclosures and derandomization attacks. Ultimately, if an asset is re-randomized between the time it is discovered and used to synthesize an attack, the attack will fail because that asset's value has changed. Like prior technologies, DDAS can be re-randomized live at runtime by adding capabilities.

Specifically, the present techniques include generating a new DDAS configuration during runtime, updating hardware structures to reflect the newly-generated parameters, and updating all code pointers in memory to use the new DDAS keys. By adding hardware for live incremental re-randomization, the present techniques achieve a low-overhead implementation and fast re-randomization times, similar to Morpheus. Whereas DDAS-R and Morpheus introduce tagged memory to track where randomized values are located at runtime, DDAS-R only needs to update code pointers once every re-randomization cycle.

In an embodiment, re-randomization of DDAS-R proceeds by flushing the pipeline to allow in-flight instructions to finish executing, generating a new DDAS configuration and re-randomize values in registers, and restarting the pipeline and updating values in memory in parallel with program execution. The update process involves translating each code pointer from DDAS→VAS using the old DDAS configuration, then translating the original VAS pointer back to DDAS using the new configuration. This value is then written back to memory. This process is generally known as a memory scan algorithm.

Figure 7:
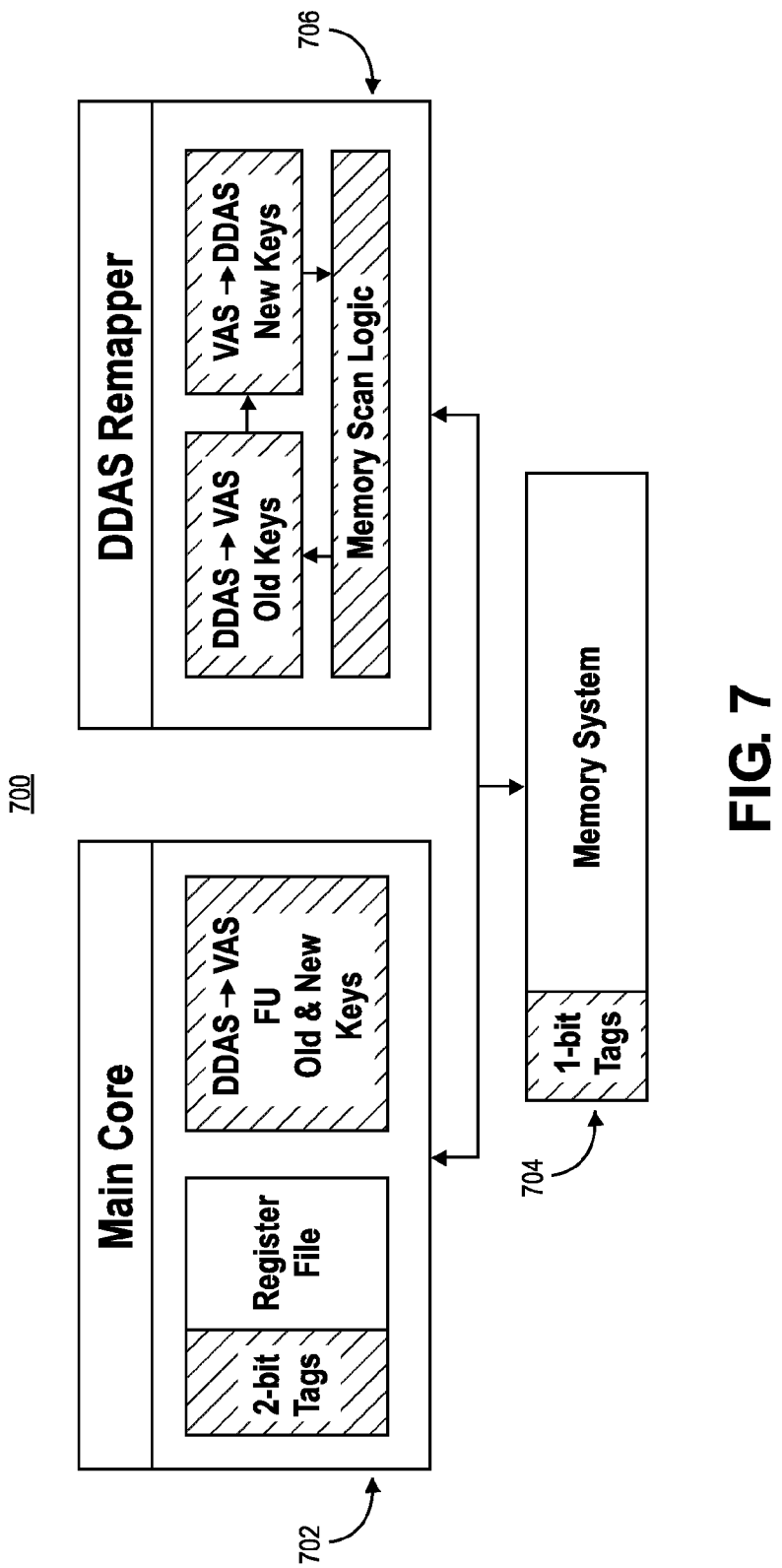
FIG. 7 depicts a pipeline for implementing dynamic remapping using DDAS runtime rerandomization, wherein additions are depicted using shaded lines, a DDAS remapper includes a DDAS→VAS functional unit that stores old keys and new keys, the pipeline includes a supplemental tag bit to indicate whether a pointer is in a new key set or an old key set, the DDAS remapper scans memory when re-randomizing to update code pointers to the new keys, and 1-bit tags in the memory system identify code pointers to update; according to an embodiment.

FIG. 7 depicts a pipeline 700 for implementing dynamic remapping using DDAS-R, according to an embodiment, wherein additions are depicted using shaded lines. The microarchitecture includes a core 702, a memory system 704, and a DDAS remapper 706. The core 702 and the memory system 704 add support for tagged memory and additional translation units. The DDAS remapper 706 accesses a functional unit similar to the hardware shown in FIG. 6 which includes a division unit, to perform VASD→DAS translation. The pipeline 700 is extended to support the propagation of tag information through the system. The memory system 704 uses tagged memory to identify which values in memory need to be updated during re-randomization. The memory system 704 extends memory by a 1-bit tag to discern whether a value is a code pointer or not, and tags each pointer-width word placing a tag at regular intervals (e.g., every 8 bytes in a 64-bit architecture). The memory system 704 receives tag information during an LLVM IR pass.

The DDAS remapper 706 conducts the memory scan algorithm described above. The DDAS remapper 706 locates code pointers using tag information and then loads those code pointers to update them to the new DDAS key and write them back to memory. The DDAS remapper 706 also handles generating a new set of DDAS keys at runtime, which uses hardware RNGs as detailed previously. Because programs continue executing while the DDAS remapper 706 is updating memory, some code pointers in memory will be using the newly generated keys, while others that have not been updated yet are using the old keys. To accommodate for this mixed-state, the present techniques instrument the pipeline 700 to correctly translate both new and stale pointer values. All registers in the pipeline 700 are extended by a single bit to convey which set of keys the value is using. When a pointer is loaded into the pipeline 700 from memory, the loaded pointer is compared to a threshold in the DDAS remapper 706 to determine if the loaded pointer is using a new key or an old key. This result is reflected in the extended tag bit, and propagated throughout the pipeline. When a jalr instruction is processed, the tag bit of the source register is used to select the appropriate DDAS keys. For the parameters d, i, $S_{vas}$, and r, selecting the appropriate DDAS keys is straightforward, because two sets of keys are stored. However, the present techniques also support two distinct Range-Map tables to support the table-based DDAS translation. In hardware, the present techniques support two distinct Range-Map tables by doubling the block size of the table entries and using a multiplexer to select the correct value.

DDAS for Data Plane Protection

The code reuse attacks discussed above occur on the control plane, and thus require the knowledge of code pointers. These attacks are prevalent in the wild. However, in recent years, the security community has seen these attacks morph into the data plane. Works like Data-Only Programming, Block Oriented Programming, and Control-Flow Bending subvert existing ROP defenses by manipulating data that impacts control flow instead of dispatching code gadgets directly. These exploits leverage memory vulnerabilities to overwrite data variables, rather than code pointers, which are used in conditionals to influence control flow. If a data value is directly modified without manipulating a data pointer, address obfuscation has no impact on the attack since knowledge of addresses is not required. However, obfuscating data location can help prevent attacks that require knowledge about the order of data variables or the address of those variables.

While DDAS could be similarly applied for data pointers, data pointer arithmetic is frequent (e.g., indexing into an array by adding an offset) and must be maintained for correctness. This frequency implies that either 1) dilation had to be undone for data pointer arithmetic, or 2) undefined memory locations cannot be placed within data structures (e.g., arrays). The former contradicts the motivations for DDAS—it is beneficial in the present techniques to prohibit attackers from crafting pointers to their target by adding a relative offset. If the present techniques maintain arithmetic for data pointers, attackers may be able to use these instructions to add their relative offsets without dilation. The latter does not work directly with the current dilation scheme of the present techniques, as it has no knowledge of the contents of memory and inflates at a fine granularity potentially between every byte of memory. Adopting DDAS and DDAS-R for data pointers is envisioned, and holds great promise for providing protections against control-flow attacks orchestrated in the data plane.

Exemplary Methods

Figure 8:
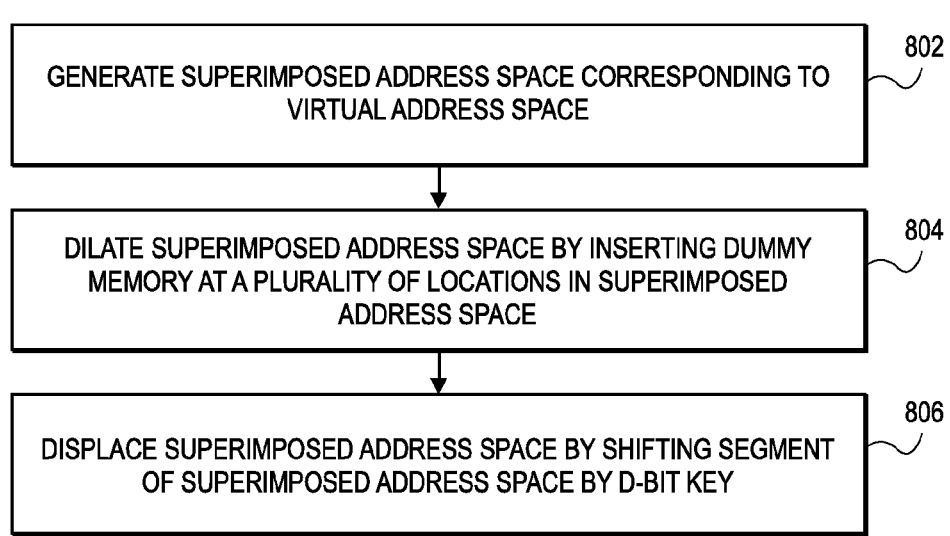
FIG. 8 depicts an exemplary method of securing a virtual address space against unauthorized access from an unauthorized agent using displaced and dilated address space techniques, according to one embodiment and scenario.

FIG. 8 depicts an exemplary method 800 of securing a virtual address space against unauthorized access from an unauthorized agent. The method 800 includes generating a superimposed address space corresponding to the virtual address space (block 802). For example, the virtual address space and generated superimposed address space of the method 800 may correspond, respectively, to the VAS 104 of FIG. 1 and the superimposed address space 102 of FIG. 1. In an embodiment, the virtual address space and generated superimposed address space may correspond, respectively, to the first address space 202 of FIG. 2 and the second address space 202 of FIG. 2. In an embodiment, the virtual address space and generated superimposed address space may correspond, respectively, to the VAS 302 of FIG. 3 and the basic DDAS 304 of FIG. 3. In yet another embodiment, the virtual address space and generated superimposed address space of the method 800 may correspond, respectively, to the VAS 402 of FIG. 4 and the table-based DDAS 404 of FIG. 4. The method 800 may be implemented by the FU 500 of FIG. 5 and/or the FU 600 of FIG. 6. Generating the superimposed address space may be performed using a set of software instructions stored in a computer memory and executed by one or more processors (e.g., one or more central processing units (CPUs), one or more graphics processing units (GPUs), etc.). In some embodiments, generating the superimposed address space may be performed using a specialized functional unit such as the one depicted in FIG. 5, FIG. 6 or FIG. 7.

The method 800 includes dilating the superimposed address space by inserting dummy memory at a plurality of locations in the superimposed address space (block 804). The dummy memory may correspond to unallocated memory of the VAS. For example, the dummy memory may correspond to the untouchable holes 208, the i-byte hole 306, and/or the holes 408. The dummy memory may include null values, numeric values, random data, and/or other information. The method 800 includes displacing the superimposed address space by shifting a segment of the superimposed address space by a d-bit key (block 806). Dilation and displacement may be used as independent techniques, or together in DDAS.

The dilation and displacement of the method 800 may be performed according to the techniques discussed with respect to FIG. 1, FIG. 2, FIG. 3 and/or FIG. 4. For example, in an embodiment, the address space may be shifted by a constant offset d. In an embodiment, the address space may be divided into segments of size $S_{vas}$, and each segment may be inflated by i bytes via the insertion of untouchable holes. The inserted holes may include null or non-null values. In another embodiment, the virtual address space may be divided into segments of size $S_{vas}$. Each segment may be mapped into a superimposed memory space and padded by an i byte hole, and each segment may be a program variable, a program variable, a code object, etc. In some cases, the entire superimposed memory space may be shifted by d bytes. A current segment number given by $N_{das}$ or $N_{ddas}$ may be used to determine how much dilation is inserted prior to a given address, allowing the present techniques to translate pointers back and forth between the virtual address space and the superimposed virtual address space, in accordance with the equations and/or microarchitecture discussed above. Finally, in some embodiments a table may be created that stores varying sized holes between valid superimposed virtual address space addresses within a single segment, wherein the individual holes in each segment, denoted $i_0$-$i_n$, sum to i bytes. In such embodiments, the present techniques may divide each segment in the superimposed virtual address space into smaller ranges of size r, and store the locations of holes in the table for efficient tracking. In embodiments, the respective values of i, d, $S_{vas}$, and/or r may be generated using a random-number generator.

As discussed above, dilation and displacement allows the present techniques to combat code reuse attacks on the control plane, by detecting and deterring the manipulation of indirect jump targets. Deterrence is enabled by increasing the uncertainty of absolute and relative addresses through displacement and dilation. In the superimposed address space of the method 800, all code pointers are expressed. This address space is displaced by a large (e.g., 64-bit key) to obfuscate absolute code location. Additionally, the method 800 leverages the key observation that large portions of the virtual address space of the method 800 are unaddressable, allowing dilation of the address space by over 250,000 times. In some embodiments, dilation is achieved by injecting large, undefined memory regions into valid memory. Because these regions are not accessible in the underlying virtual address space, any access to these holes is indicative of an attack and results in an immediate security exception. To disclose or manipulate a code pointer under DDAS, an attacker must guess the value of the pointer through high-entropy defenses (e.g., 63 bits for displacement, 55 bits for dilation), and do this without ever touching an undefined memory location. Thus, the approach of DDAS makes it incredibly unlikely for an attacker to exfiltrate or manipulate a code pointer. Additionally, with runtime re-randomization, as discussed above, the challenge to the attacker is coupled with a time limit of 50 ms on average. By leveraging hardware support, the present techniques implement DDAS defenses while keeping performance overheads well below 5%. The improvements that the present techniques provide represent a significant and unheralded advance in the field of computer security, and in particular, in the field of preventing and mitigating code injection security attacks such as those summarized in the Background of this application.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

Of course, the applications and benefits of the systems, methods and techniques described herein are not limited to only the above examples. Many other applications and benefits are envisioned using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optional discs, semiconductor memories, biological memories, other memory devices or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology later developed that would still fall within the scope of the claims. By way of example, and not limitation, the disclosure herein contemplates at least the following aspects:

1. A computer-implemented method of securing a virtual address space against unauthorized access from an unauthorized agent, the method comprising: generating a superimposed address space corresponding to the virtual address space, dilating the superimposed address space by inserting dummy memory at a plurality of locations in the superimposed address space, and displacing the superimposed address space by shifting a segment of the superimposed address space by a d-bit key.

2. The computer-implemented method of aspect 1, further comprising: causing, in response to detecting an access of any of the dummy memory at the plurality of locations in the superimposed address space, a security exception to be raised.

3. The computer-implemented method of aspect 1, wherein the d-bit key is a 64-bit key.

4. The computer-implemented method of aspect 1, wherein dilating the superimposed address space by inserting dummy memory at the plurality of locations in the superimposed address space includes: dividing the virtual address space into segments of size $S_{vas}$, inserting dummy memory holes of size i bytes into each of the segments of size $S_{vas}$, and mapping each of the segments of size $S_{vas}$ to a respective segment of the superimposed address space having size $S_{ddas}$.

5. The computer-implemented method of aspect 1, wherein dilating the superimposed address space by inserting dummy memory at the plurality of locations in the superimposed address space includes: applying a cryptographic function to encrypt virtual address $A_{vas}$ to the corresponding superimposed address $A_{ddas}$; and applying a cryptographic function to decrypt superimposed address $A_{ddas}$ to the corresponding virtual address $A_{vas}$.

6. The computer-implemented method of aspect 4, wherein segments of size $S_{vas}$, are non-contiguous in memory.

7. The computer-implemented method of aspect 4, wherein inserting the dummy memory holes of size i bytes into each of the segments of size $S_{vas}$ includes assigning one or both of (i) a null value, and (ii) a non-null value into at least one of the dummy memory holes.

8. The computer-implemented method of aspect 4, further comprising: padding the end of each respective segment of the superimposed address space having size $S_{ddas}$ with an i-byte hole.

9. The computer-implemented method of aspect 8, wherein each respective segment is one or more of a program variable, a program subvariable, or a code object.

10. The computer-implemented method of claim 4, further comprising: generating i, d, and $S_{vas}$, respectively, using a random-number generator.

11. The computer-implemented method of aspect 4, further comprising: for each respective segment of the superimposed address space having size $S_{ddas}$, dividing the segment into a plurality of r-sized ranges, for each range r' of the r-sized ranges, for each byte b in i bytes, inserting the byte b at a location in r', wherein the location is determined by reference to a range-map table.

12. The computer-implemented method of aspect 11, further comprising: generating r using a random-number generator.

13. The computer-implemented method of aspect 11, further comprising: generating the range-map key using a true random number generator, seeding a pseudo-random number generator using the range-map key, and generating the range-map table using the seeded pseudo-random number generator.

14. The computer-implemented method of aspect 11, wherein the range-map table has an even number of entries.

15. The computer-implemented method of aspect 11, wherein the range-map table has an odd number of entries.

16. The computer-implemented method of aspect 4 or aspect 5, further comprising: re-randomizing the superimposed address space by regenerating i, d, and $S_{vas}$, respectively, using the random-number generator, flushing and restarting a processor pipeline, updating a respective value of a plurality of pointers, by a first translation including translating each pointer from a respective first superimposed address space value to a respective first virtual address space value, and a second translation including translating each pointer from a respective second virtual address space value to a respective second superimposed virtual address space value, wherein the second translation is based on the regenerated i, d, and $S_{vas}$.

17. The computer-implemented method of aspect 16, wherein each pointer in the plurality of pointers is associated with a tag bit indicating whether the pointer is in and old key set or a new key set.

18. A computer processor, comprising: a memory, and a dedicated functional unit in a stage of a pipeline of the computer processor, the computer processor including an indirect jump (jalr) instruction that when executed by the dedicated functional unit causes the computer processor to: translate one or more pointers between displaced and dilated address spaces of the memory and virtual address spaces of the memory.

19. The computer processor of aspect 18, wherein the dedicated functional unit includes a further instruction that when executed by the dedicated functional unit causes the computer processor to: check each of the one or more translated pointers to determine whether the each of the one or more translated pointers has an invalid memory address.

20. A computer processor, comprising: a memory, and a dedicated functional unit in a stage of a pipeline of the computer processor, the computer processor including a memory access instruction that when executed by the dedicated functional unit causes the computer processor to: translate one or more pointers between displaced and dilated address spaces of the memory and virtual address spaces of the memory.

What is claimed:

1. A computer-implemented method of securing a virtual address space against unauthorized access from an unauthorized agent, the method comprising:
    generating a superimposed address space corresponding to the virtual address space,
    dilating the superimposed address space by inserting dummy memory at a plurality of locations in the superimposed address space by at least:
        dividing the virtual address space into segments of size $S_{vas}$, where $S_{vas}$ denotes a segment size in bytes, inserting dummy memory holes of size i bytes, where i denotes an integer number of bytes, into each of the segments of size $S_{vas}$; and mapping each of the segments of size $S_{vas}$ to a respective segment of the superimposed address space having size $S_{ddas}$; and displacing the superimposed address space by applying, to addresses in the superimposed address space, an arithmetic shift having a constant offset determined by a d-bit key.

2. The computer-implemented method of claim 1, further comprising:

causing, in response to detecting an access of any of the dummy memory at the plurality of locations in the superimposed address space, a security exception to be raised.

3. The computer-implemented method of claim 1, wherein the d-bit key is a 64-bit key.

4. The computer-implemented method of claim 1, wherein dilating the superimposed address space by inserting dummy memory at the plurality of locations in the superimposed address space includes:

applying a first cryptographic function to encrypt virtual address $A_{vas}$ to a corresponding superimposed address $A_{ddas}$; and applying a second cryptographic function to decrypt superimposed address Addas to a corresponding virtual address $A_{vas}$.

5. The computer-implemented method of claim 1, wherein the segments of size $S_{vas}$ are non-contiguous in memory.

6. The computer-implemented method of claim 1, wherein inserting the dummy memory holes of size i bytes into each of the segments of size $S_{vas}$ includes assigning one or both of (i) a null value, and (ii) a non-null value into at least one of the dummy memory holes.

7. The computer-implemented method of claim 1, further comprising:

padding an end of each respective segment of the superimposed address space having size $S_{ddas}$ with an i-byte hole.

8. The computer-implemented method of claim 7, wherein each respective segment is one or more of a program variable, a program subvariable, or a code object.

9. The computer-implemented method of claim 1, further comprising:

generating i, d, and $S_{vas}$, respectively, using a random-number generator.

10. The computer-implemented method of claim 1, further comprising:

for each respective segment of the superimposed address space having size $S_{ddas}$, dividing the segment into a plurality of r-sized ranges, for each range r' of the plurality of r-sized ranges, for each byte b in i bytes, inserting the byte b at a location in r', wherein the location is determined by reference to a range-map table.

11. The computer-implemented method of claim 10, further comprising:

generating r using a random-number generator.

12. The computer-implemented method of claim 10, further comprising:

generating a range-map key using a true random number generator, seeding a pseudo-random number generator using the range-map key, and generating the range-map table using the seeded pseudo-random number generator.

13. The computer-implemented method of claim 10, wherein the range-map table has an even number of entries.

14. The computer-implemented method of claim 10, wherein the range-map table has an odd number of entries.

15. The computer-implemented method of claim 1 or claim 4, further comprising:

re-randomizing the superimposed address space by regenerating i, d, and $S_{vas}$, respectively, using a random-number generator, flushing and restarting a processor pipeline, updating a respective value of a plurality of pointers, by a first translation including translating each pointer from a respective first superimposed address space value to a respective first virtual address space value, and a second translation including translating each pointer from a respective second virtual address space value to a respective second superimposed virtual address space value, wherein the second translation is based on the regenerated i, d, and $S_{vas}$.

16. The computer-implemented method of claim 15, wherein each pointer in the plurality of pointers is associated with a tag bit indicating whether the pointer is in an old key set or a new key set.

17. A computer processor, comprising:

a memory, and a dedicated functional unit in a stage of a pipeline of the computer processor, the computer processor including an indirect jump (jalr) instruction that when executed by the dedicated functional unit causes the computer processor to:

translate one or more pointers between displaced and dilated address space in a superimposed address space of the memory and virtual address space of the memory, wherein the displaced and dilated address space has been dilated by at least:

dividing the virtual address space into segments of size $S_{vas}$, where $S_{vas}$ denotes a segment size in bytes, inserting dummy memory holes of size i bytes, where i denotes an integer number of bytes, into each of the segments of size $S_{vas}$; and mapping each of the segments of size $S_{vas}$ to a respective segment of the superimposed address space having size $S_{ddas}$.

18. The computer processor of claim 17, wherein the dedicated functional unit includes a further instruction that when executed by the dedicated functional unit causes the computer processor to:

check each of the one or more translated pointers to determine whether the each of the one or more translated pointers has an invalid memory address.

19. A computer processor, comprising:

a memory, and a dedicated functional unit in a stage of a pipeline of the computer processor, the computer processor including a memory access instruction that when executed by the dedicated functional unit causes the computer processor to:

translate one or more pointers between displaced and dilated address space in a superimposed address space of the memory and virtual address space of the memory, wherein the displaced and dilated address space has been dilated by at least:

dividing the virtual address space into segments of size $S_{vas}$, where $S_{vas}$ denotes a segment size in bytes, inserting dummy memory holes of size i bytes into each of the segments of size $S_{vas}$, where i denotes an integer number of bytes; and mapping each of the segments of size $S_{vas}$ to a respective segment of the superimposed address space having size $S_{ddas}$.

* * * * *